United States Patent
Liebau et al.

(10) Patent No.: US 11,574,546 B2
(45) Date of Patent: Feb. 7, 2023

(54) METHOD FOR MANEUVERING VEHICLES IN CLUSTERS

(71) Applicant: Bayerische Motoren Werke Aktiengesellschaft, Munich (DE)

(72) Inventors: Claudia Liebau, Landshut (DE); Daniel Liebau, Landshut (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 306 days.

(21) Appl. No.: 16/651,054

(22) PCT Filed: Nov. 6, 2018

(86) PCT No.: PCT/DE2018/100898
§ 371 (c)(1),
(2) Date: Mar. 26, 2020

(87) PCT Pub. No.: WO2019/086083
PCT Pub. Date: May 9, 2019

(65) Prior Publication Data
US 2020/0265722 A1  Aug. 20, 2020

(30) Foreign Application Priority Data
Nov. 6, 2017 (DE) .................... 10 2017 219 695.5

(51) Int. Cl.
*G08G 1/00* (2006.01)
*B60R 1/062* (2006.01)
*G05D 1/02* (2020.01)

(52) U.S. Cl.
CPC .............. *G08G 1/22* (2013.01); *B60R 1/062* (2013.01); *G05D 1/0212* (2013.01); *G05D 1/0287* (2013.01); *G05D 2201/0213* (2013.01)

(58) Field of Classification Search
CPC ...... G08G 1/22; G05D 1/0212; G05D 1/0287; G05D 2201/0213; B60R 1/062
See application file for complete search history.

(56) References Cited

U.S. PATENT DOCUMENTS

| 5,572,449 A | 11/1996 | Tang et al. |
| 2010/0256835 A1* | 10/2010 | Mudalige ............... G08G 1/164 701/2 |

(Continued)

FOREIGN PATENT DOCUMENTS

| DE | 10 2010 013 647 A1 | 2/2011 |
| DE | 10 2014 200 804 A1 | 7/2015 |

(Continued)

OTHER PUBLICATIONS

International Search Report (PCT/ISA/210) issued in PCT Application No. PCT/DE2018/100898 dated Mar. 7, 2019 with English translation (six (6) pages).

(Continued)

*Primary Examiner* — Jess Whittington
(74) *Attorney, Agent, or Firm* — Crowell & Moring LLP (57) ABSTRACT

A method maneuvers vehicles in clusters. The method forms a first main cluster, the first main cluster having at least two 1st-order sub-clusters that each have at least one cluster vehicle, and having a first cluster formation with a predefined cluster length. The method determines a first leading vehicle for the first main cluster from the cluster vehicles; and maneuvers the first main cluster. The cluster vehicles of the first main cluster orient themselves to the first leading vehicle. The first cluster formation is maintained for the first main cluster for as long as the maximum length of the first main cluster remains less than or equal to the sum of the predefined cluster length and a tolerance length.

13 Claims, 4 Drawing Sheets (56) References Cited

U.S. PATENT DOCUMENTS

2014/0316671 A1    10/2014  Okamoto
2018/0190119 A1*   7/2018  Miller, Jr. ........... B60W 30/165
2020/0064140 A1*   2/2020  Tarkiainen ....... G08G 1/096811

FOREIGN PATENT DOCUMENTS

DE    10 2017 200 871 A1    7/2018
EP            2 390 858 A1   11/2011
WO    WO 2010/098554 A2     9/2010

OTHER PUBLICATIONS

German-language Written Opinion (PCT/ISA/237) issued in PCT Application No. PCT/DE2018/100898 dated Mar. 7, 2019 (six (6) pages).

German-language Search Report issued in German Application No. 102017219695.5 dated Jul. 26, 2018 with partial English translation (11 pages).

* cited by examiner

METHOD FOR MANEUVERING VEHICLES IN CLUSTERS

BACKGROUND AND SUMMARY OF THE INVENTION

The invention relates to a method for maneuvering vehicles in clusters.

Systems for vehicles that ensure that a vehicle follows a vehicle in front are known. One example of these is an automatic vehicle following system as described in U.S. Pat. No. 5,572,449. In this case, the trajectory of the vehicle in front is followed and at the same time the distance between the vehicle and the vehicle in front of it is adjusted.

There are furthermore concepts that relate to convoy vehicle management, that is to say controlling vehicles within a convoy. In this case, the convoy of vehicles is formed and controlled taking maximum fuel efficiency into consideration. As a distance between at least two vehicles decreases, the air resistance of the respectively following vehicles is reduced, resulting overall in a reduction in the energy consumption of the vehicles involved. It is assumed that an overall energy saving of up to 20% is able to be achieved by way of traveling in a convoy.

The concepts described above do not however target reducing congestion. Congestion formation is however increasing to a greater extent specifically in built-up areas because the road network is not designed to be able to cope with the increasing volume of traffic. It would therefore be desirable to efficiently use the available traffic area.

The invention is therefore based on the object of specifying a method for maneuvering vehicles in clusters, by way of which method efficient use of the available traffic area is ensured.

The object is achieved by the features of the independent patent claims. Advantageous embodiments are described in the dependent claims. It is pointed out that additional features of a patent claim dependent on an independent patent claim, without the features of the independent patent claim or only in combination with a subset of the features of the independent patent claim, may form a separate invention independent of the combination of all of the features of the independent patent claim and that may be made into the subject matter of an independent claim, a divisional application or a subsequent application. This applies analogously to the technical teaching described in the description, which teaching may form an invention independent of the features of the independent patent claims.

One aspect of the invention relates to a method for maneuvering vehicles in clusters, wherein the method comprises:

forming a first main cluster, wherein the first main cluster comprises at least two 1st-order subclusters each having at least one cluster vehicle and wherein the first main cluster has a first cluster formation with a predefined cluster length;

determining a first lead vehicle for the first main cluster from the cluster vehicles; and maneuvering the first main cluster, wherein the cluster vehicles of the first main cluster orient themselves with respect to the first lead vehicle and wherein the first cluster formation is maintained for the first main cluster for as long as the maximum length of the first main cluster is less than or equal to the sum of the predefined cluster length and a tolerance length.

In the context of the present document, the term "cluster vehicle" should be understood to mean any type of vehicle by way of which people and/or freight are able to be moved. Possible examples of this are: motor vehicle, trucks, land vehicles, buses, driver's cabs, cable cars, elevator cars, rail vehicles, watercraft (for example ships, boats, submarines, diving bells, hovercraft, hydrofoils), aircraft (aeroplanes, helicopters, ground effect vehicles, airships, balloons). The vehicle is preferably a motor vehicle. A motor vehicle in this sense comprises an automobile, a motorcycle and a tractor.

In the context of the present document, the term "maneuvering vehicles in clusters" is understood to mean leading and/or controlling and/or steering and/or piloting a plurality of vehicles in a vehicle group to a location and/or along a path and/or along a route. A main cluster is thus a vehicle group consisting of at least two vehicles that travel together in a coordinated manner. In the context of the present document, the vehicles that are in the vehicle group are called cluster vehicles. The cluster vehicles usually have the same destination or intermediate destination and/or wish to cover the same path or intermediate path. The vehicles that have already been identified as vehicles belonging to the main cluster are furthermore likewise referred to as cluster vehicles, for example because they have the same destination or intermediate destination but have not yet taken up their respective cluster position within the cluster formation.

The formation adopted by the main cluster depends on various factors. A cluster formation is in this case understood to mean a specific arrangement of at least two cluster vehicles. According to the present document, a cluster has at least two subclusters, wherein the respective subcluster has at least one cluster vehicle.

According to the present document, the cluster formation represents the basic arrangement within a main cluster. The cluster formation thus provides information about how many subclusters (for example 1st-order subcluster, 2nd-order subcluster, etc.), and thus how many cluster vehicles, are involved in the main cluster. The cluster formation furthermore describes the basic arrangement of the 1st-order and possibly 2nd-order subclusters within the main cluster. The term "subcluster" should be understood below to mean a collective term for 1st-order subclusters and/or 2nd-order subclusters. A 1st-order subcluster is always part of a main cluster. A 2nd-order subcluster is always part of a 1st-order subcluster and therefore also part of a main cluster.

The cluster formation thus in principle describes the arrangement of the individual cluster vehicles with respect to one another within the subclusters and the arrangement of the individual subclusters with respect to one another within the main cluster. In other words, the cluster formation describes how the cluster vehicles are arranged geometrically within the subclusters and how the subclusters are arranged geometrically within the main clusters. The cluster formation does not however describe the exact location of each cluster vehicle. This means that the cluster formation is maintained even when the individual cluster vehicles fluctuate around their singly assigned cluster positions, as long as this takes place within a predetermined radius around the assigned cluster positions. By way of example, the cluster formation describes the arrangement of four 2nd-order subclusters that each consist of four cluster vehicles, wherein the 2nd-order subclusters are arranged behind one another in the direction of travel. According to a further example, the cluster formation describes the arrangement of three 2nd-order subclusters in an upside-down triangle in the direction of travel, wherein each 2nd-order subcluster consists only of one vehicle.

The singly formed cluster formation has a particular predefined cluster length. In other words, the particular cluster formation predefines a length of the main cluster. In the present document, the cluster length is intended to be defined on the basis of a rectangular envelope imagined around the respective cluster formation. In the present document, the cluster length should not necessarily correspond to the longest dimension of a rectangular envelope imagined around the respective cluster formation, but rather correspond to the dimension, lying essentially in the direction of travel, of a rectangular envelope imagined around the respective cluster formation. The term "essentially in the direction of travel" is understood to mean a dimension that does not have to point exactly in the direction of travel but that is closest to the direction of travel. Direction of travel in this case means the direction of travel of the respective main cluster, wherein the direction of travel of the respective main cluster is preferably determined by the direction of travel of the respective lead vehicle. Travel in a straight line should be taken as a basis for defining the cluster length, and the dimension of the cluster formation in the direction of travel should be considered on the basis thereof. The definition of the cluster length described above applies in the same way to the length of the subclusters, the maximum length of a main cluster, etc.

The cluster vehicles are assigned to the respective subclusters in accordance with various criteria. For the 1st-order subclusters, the size of the respective cluster vehicles is applied. Accordingly, for example in the case of a main cluster that consists of two 1st-order subclusters, trucks and buses are assigned to a first 1st-order subcluster and automobiles and vans are assigned to a second 1st-order subcluster. According to another example, in the case of a subcluster that consists of two 1st-order subclusters, a bus is assigned to a first 1st-order subcluster and a plurality of automobiles are assigned to the second 1st-order subcluster; in this case, the second 1st-order subcluster comprises as many automobiles whose cumulative length corresponds to the length of the bus in the first 1st-order subcluster. In other words, the second 1st-order subcluster is filled with the same number of automobiles that form the same length as the first 1st-order subcluster.

For the 2nd-order subclusters, criteria such as the degree of automation of the cluster vehicles, the engine power of the cluster vehicles, the destination or intermediate destination of the cluster vehicles, the navigation destination of the cluster vehicles, the adjusted speed (for example adjusted by a cruise control system) of the cluster vehicles, the common travel route or the common travel route section of the cluster vehicles etc. are applied.

A 2nd-order subcluster preferably comprises only cluster vehicles of the same vehicle type. By way of example, a first 2nd-order subcluster comprises only automobiles, whereas a second 2nd-order subcluster comprises a truck. As an alternative or in addition, a 2nd-order subcluster comprises only cluster vehicles that have essentially the same vehicle length. By way of example, a first 2nd-order subcluster then comprises only automobiles of the same length, whereas a second 2nd-order subcluster comprises a truck. As an alternative or in addition, a 2nd-order subcluster meets the condition whereby at least one of the cluster vehicles of the 2nd-order subcluster has a partly automated, preferably a highly automated, even more preferably a fully automated degree of automation.

As already described, a lead vehicle (for example first lead vehicle, second lead vehicle, etc.) for the respective main cluster is selected from the cluster vehicles. An additional lead vehicle may furthermore be selected from the cluster vehicles for a subcluster, preferably for each subcluster. In this case, a lead vehicle may at the same time also serve as an additional lead vehicle. The cluster vehicles of the respective main cluster or of the respective subcluster that are not a lead vehicle or additional lead vehicle are referred to as following vehicles.

The term following vehicle in the present document is understood to mean a vehicle that follows another vehicle, specifically the lead vehicle or additional lead vehicle. In this case, however, the term "follow" should not be understood to mean a spatial arrangement of the following vehicle with respect to the lead vehicle or additional lead vehicle. This means in particular that a following vehicle does not necessarily have to be arranged behind a lead vehicle or additional lead vehicle, but rather may for example be arranged next to or slightly offset from or in front of the lead vehicle or additional lead vehicle. A following vehicle position is thus not necessarily a position behind the lead vehicle or additional lead vehicle, but rather describes the property whereby the following vehicle follows the lead vehicle or additional lead vehicle.

The procedures described in the present document for determining a cluster formation are executed by a control device. The control device may be arranged in or on a cluster vehicle or externally to the vehicle, for example in a computer center, a data processing center, a traffic control center or a traffic management system, a server or on a cloud. The cluster formation is preferably determined in a lead vehicle or additional lead vehicle.

The main cluster or main clusters and the subclusters are maneuvered by the cluster vehicles orienting themselves with respect to the lead vehicle or the respective additional lead vehicle. The lead vehicle or additional lead vehicle may in this case take on the task of defining a route followed by the individual cluster vehicles, preferably the following vehicles. The lead vehicle or additional lead vehicle may furthermore take on the task of maneuvering the individual cluster vehicles along the defined route. The lead vehicle or additional lead vehicle preferably has a sensor system by way of which the cluster vehicles are maneuvered.

When maneuvering, the main cluster or the subclusters acts or act as a fixed unit. In this case, the cluster vehicles of the first main cluster orient themselves with respect to the first lead vehicle; the cluster vehicles of the second main cluster possibly orient themselves with respect to the second lead vehicle; and the cluster vehicles of the respective subclusters possibly orient themselves with respect to the respective additional lead vehicles. The cluster vehicles of a main cluster do not always in this case have to travel at the same speed or with the same steering angle or along or offset in parallel with the same trajectory, but the cluster vehicles of a main cluster follow the same trajectory as a unit. The cluster vehicles of a 2nd-order subcluster however travel at least at the same speed. In addition, the cluster vehicles of a 2nd-order subcluster may also travel along or offset in parallel with the same trajectory and/or with the same steering angle. The individual 2nd-order subclusters may thus each move at different speeds. In other words, the cluster vehicles of a first 2nd-order subcluster may move at a different speed than the cluster vehicles of a second 2nd-order subcluster.

The maneuvering may comprise executing maneuver steps. In this case, the maneuver steps may be performed by one cluster vehicle executing the maneuver steps after the other or else all of the cluster vehicles executing the respective maneuver steps at the same time.

In order to maneuver, the cluster vehicles may receive maneuver signals that are then correspondingly implemented in the respective cluster vehicle. The maneuver signals may be received by a communication device arranged in or on the respective cluster vehicle. The lead vehicle or additional lead vehicle preferably transmits the maneuver signals to the following vehicles or to the communication device of the respective following vehicle. The maneuver signals comprise at least one of the following items of information: information regarding the cluster route, information regarding the route of the respective cluster vehicle, information regarding the speed of the respective cluster vehicle, information regarding the distance between a cluster vehicle and one or more adjacent cluster vehicles, information regarding the direction of travel of the respective cluster vehicle, information regarding the cluster position of the respective cluster vehicle, information regarding a steering motion of the respective cluster vehicle, etc.

The maneuver signals are preferably updated for one or more cluster vehicles when another output situation results and/or one or more cluster vehicles deviate from the previously transmitted maneuver signal (setpoint situation). Such maneuver signals that are suitable for updating and/or correcting purposes comprise at least one of the following items of information: information regarding an acceleration impulse of the respective cluster vehicle, information regarding a braking impulse of the respective cluster vehicle, information regarding a steering correction angle of the respective cluster vehicle, etc.

In other words, the cluster vehicles are steered and corrected by the lead vehicle or additional lead vehicle in terms of their position, their direction of travel, and their speed and steering commands. As a result, better use is thereby made of the driving lane width or the existing driving lane area, as a result of which congestion formation is ultimately reduced.

In order to form a main cluster, a corresponding cluster position in the main cluster or subcluster may be assigned to each cluster vehicle after a cluster formation (for example first cluster formation, second cluster formation, etc.) is determined. The corresponding cluster position describes the position of the cluster vehicle in the main cluster or subcluster as well as the position of the cluster vehicle within the cluster formation in accordance with the previously determined cluster formation. The cluster vehicles may then adopt the cluster position respectively assigned thereto. In order to assign a corresponding cluster position to each cluster vehicle, each cluster vehicle may have a communication device that receives the corresponding cluster position. The corresponding cluster position is preferably transmitted by a control device, as described above, to the respective communication device. The communication may in this case take place in a wired manner (for example by way of a USB interface) or wirelessly (for example Bluetooth, WLAN, mobile radio). The corresponding cluster position is preferably assigned to the respective cluster vehicle by a lead vehicle or by an additional lead vehicle.

After the reception of the corresponding cluster position, it may be decided whether the respective cluster vehicle is already occupying its corresponding cluster position or whether a shunting procedure is required in order to adopt the corresponding cluster position. This decision may be made for example in a position adoption device that is arranged either in each of the cluster vehicles or in one of the cluster vehicles or externally to the vehicle by a central device, for example in a computer center and/or on a server and/or in a cloud. If it has been decided that the respective cluster vehicle has to be shunted to the cluster position assigned thereto, then a shunting trajectory is calculated.

The shunting trajectory may be determined by the position adoption device. The shunting procedure for the respective cluster vehicle may likewise be controlled by the position adoption device. As an alternative or in addition, the shunting procedure may be controlled by the control device described above. The assignment procedure is executed by the control device described above. The required shunting procedures for the cluster vehicles may be executed either in succession or simultaneously. The shunting procedures are preferably performed with the additional assistance of sensor systems arranged in or on the cluster vehicles.

The cluster formation may for example be selected such that the sum of the shunting paths for the cluster vehicles required to adopt the respective cluster positions is a minimum. The cluster formation may thus for example be determined not only depending on the vehicle dimensions of the cluster vehicles and the driving area available for travel, but rather also depending on the sum of the required shunting paths for the cluster vehicles. It is in this case attempted to find a cluster formation in which as many cluster vehicles as possible require a small or even no shunting path in order to shunt from their actual position to the respective cluster position.

In the context of the present document, a sensor system is understood to mean a system having one or more sensors, wherein the sensor system comprises at least one of the following apparatuses: ultrasound sensor, radar sensor, lidar sensor and/or camera. The sensor data recorded by the sensor system may originate from one of the abovementioned apparatuses or from a combination of a plurality of the abovementioned apparatuses (sensor data fusion). The sensor system is advantageously integrated into a driver assistance system of the respective cluster vehicle and may be used for the respective actions of the method for maneuvering vehicles in clusters.

During the maneuvering of a main cluster, the cluster vehicles essentially keep the vehicle arrangement in its respective cluster formation, for example in the first cluster formation and/or in the second cluster formation. In this case, the cluster vehicles move essentially in their assigned cluster position. This does not however mean that each cluster vehicle maintains the exact same position during the maneuvering. Each cluster vehicle may move or stay around the particular cluster position in the cluster formation within a tolerance area. The previously determined cluster formation, and therefore also the cluster positions, in principle essentially remain the same for the cluster vehicles.

The first cluster formation is in this case maintained for the first main cluster for as long as the maximum length of the first cluster is less than or equal to the sum of the predefined cluster length and a tolerance length. In other words, the first cluster formation as has been determined only ceases to exist when the cluster vehicles leave their determined cluster position to such an extent, that is to say move away beyond the tolerated radius around their particular cluster position to such an extent, that the dimensions of the first cluster formation that were determined beforehand are no longer able to be maintained. Whether the cluster vehicles of the first main cluster are still within the dimensions of the first cluster formation is able to be determined on the basis of the maximum length of the first main cluster. The maximum length of the first cluster describes the maximum length, that is to say the actual maximum length, of the first main cluster. The tolerance length is the length of a tolerance area adjoining the predefined cluster length.

The maximum length or the actual length of the first main cluster does not necessarily have to match the predefined cluster length. The maximum length is preferably determined by the longest dimension, in the direction of travel, of a rectangular envelope imagined around the respective current cluster arrangement, that is to say around the respective current arrangement of the subclusters and the associated cluster vehicles. Direction of travel in this case means the direction of travel of the respective current main cluster, wherein the direction of travel of the respective main cluster is preferably determined by the direction of travel of the respective lead vehicle. The current arrangement of the subclusters and of the associated cluster vehicles incorporates a certain fluctuation of the cluster vehicles around their singly assigned cluster position, as has also been explained further above.

In other words, the cluster formation of the first main cluster is not changed as long as the subclusters or the cluster vehicles move essentially in the first main cluster at their respective cluster positions including a certain tolerance. If the cluster vehicles deviate from the cluster positions assigned thereto beyond the tolerance, then the cluster formation is no longer maintained for the first main cluster. Tolerance in this case means a predetermined radius around the singly assigned cluster position.

According to one embodiment, at least one of the 1st-order subclusters has at least two 2nd-order subclusters each having at least one cluster vehicle. A 2nd-order subcluster is excluded from the first main cluster if the maximum length of the first main cluster is greater than the sum of the predefined cluster length and the tolerance length.

If a 2nd-order subcluster thus moves too far away from the originally defined first cluster formation, maneuvering the first main cluster with the originally defined first cluster formation would be too complicated. Excluding a 2nd-order subcluster therefore restores efficient maneuvering of the first main cluster.

According to a further embodiment, the first main cluster has different types of vehicle. The different types of vehicle preferably comprise automobiles (for example van, SUV, limousine, cabriolet, coupe, combi, roadster), in each case with and without trailers; trucks; land vehicles; and buses.

According to a further embodiment, the method furthermore comprises forming a second main cluster for cluster vehicles, wherein the second main cluster has a second cluster formation, determining a second lead vehicle for the second main cluster from the cluster vehicles; and maneuvering the first main cluster and the second main cluster, wherein the cluster vehicles of the first main cluster orient themselves with respect to the first lead vehicle and the cluster vehicles of the second main cluster orient themselves with respect to the second lead vehicle, wherein the 2nd-order subcluster excluded from the first main cluster is furthermore incorporated into the second main cluster.

According to a further embodiment, the method furthermore comprises determining an additional lead vehicle for at least one of the 2nd-order subclusters from the cluster vehicles of the first main cluster and/or of the second main cluster; wherein maneuvering the first main cluster and/or the second main cluster comprises maneuvering the at least one 2nd-order subcluster, wherein the cluster vehicles of the respective 2nd-order subcluster orient themselves with respect to the respective additional lead vehicle.

According to one embodiment, the first cluster formation and/or the second cluster formation are determined depending on the vehicle dimensions of the respective cluster vehicles and the driving area available for travel. Vehicle dimensions in this case in particular mean the external dimensions, for example the width, the length and the height, of the respective cluster vehicles. In this case, the vehicle dimensions may be maximum specifications, for example the overall width, that is to say the distance from one wing mirror to the other, or another maximum dimension, for example the vehicle width of the chassis when the wing mirrors are folded in. The driving area available for travel comprises one or more traffic structures on which vehicles are able to move from one location to another. The driving area available for travel is in particular formed from one or more driving lanes. Depending on the embodiment, the driving area available for travel, in addition to the roadway or roadways, may also be formed by at least one of the following: one or more verges, one or more hard shoulders, one or more lane boundaries, one or more cycle lanes, one or more sidewalks, one or more parking areas or parking spaces, one or more stopping locations, one or more emergency lanes and one or more traffic calming areas. The driving area available for travel is preferably a fixed surface, such as for example an asphalt concrete surface, a cement concrete surface, a plaster surface and/or a compressed aggregate surface.

In other words, in order to determine the first cluster formation and/or the second cluster formation, the driving area available for travel, that is to say for example the width and number of existing driving lanes, as well as the vehicle dimensions of the cluster vehicles, are determined, and the arrangement of the cluster vehicles is defined accordingly.

According to a further embodiment, when the first main cluster and/or the second main cluster is formed, the cluster vehicles are arranged independently of predefined driving lanes and/or predefined minimum distances between the cluster vehicles.

In other words, the cluster vehicles may be arranged so as to be distributed over the driving lanes such that possibly more than one vehicle occupies a driving lane. The cluster vehicles may furthermore be arranged such that driving lane boundaries are crossed by one or more cluster vehicles. In other words, a cluster vehicle does not have to travel within the driving lane predefined by driving lane boundaries, but rather may for example travel such that a driving lane boundary is situated below the vehicle. In this case, the cluster vehicles may arrange themselves such that they travel closer next to one another and/or behind one another than would be the case when maintaining predefined minimum distances.

If the cluster vehicles are arranged across the predefined driving lanes or so as to fall below the predefined minimum distances, optimum use is able to be made of the available driving area and the number of vehicles per driving area is able to be increased. This may contribute to reducing congestion.

According to a further embodiment, when the first main cluster and/or the second main cluster is formed and/or maneuvered, at least one wing mirror of at least one of the cluster vehicles of the first main cluster and/or of the second main cluster is folded in. The distance between the individual cluster vehicles is thereby able to be reduced, resulting in a more compact cluster formation and efficient use of the driving area available for travel.

According to a further embodiment, the first main cluster and/or the second main cluster have cluster positions corresponding to the first cluster formation or the second cluster formation. In the case of traffic driving on the left-hand side, at least one of the following actions is performed: determining the cluster vehicle at the front left cluster position, in the direction of travel, of the first main cluster as first lead vehicle; determining the cluster vehicle at the front left cluster position, in the direction of travel, of the second main cluster as second lead vehicle; and determining the cluster vehicle at the front left cluster position, in the direction of travel, of a 2nd-order subcluster as additional lead vehicle. In the case of traffic driving on the right-hand side, at least one of the following actions is performed: determining the cluster vehicle at the front right cluster position, in the direction of travel, of the first main cluster as first lead vehicle; determining the cluster vehicle at the front right cluster position, in the direction of travel, of the second main cluster as second lead vehicle; and determining the cluster vehicle at the front right cluster position, in the direction of travel, of a 2nd-order subcluster as additional lead vehicle.

By selecting one of the front cluster vehicles as the lead vehicle, the cluster vehicles following behind it (following vehicles) are easily able to orient themselves with respect to the lead vehicle.

According to a further embodiment, the method for maneuvering vehicles in clusters furthermore comprises one of the following actions: the cluster vehicle that has the highest degree of automation from the first main cluster is determined as first lead vehicle of the first main cluster; the cluster vehicle that has the highest degree of automation from a 2nd-order subcluster is determined as additional lead vehicle; and the cluster vehicle that has the highest degree of automation from the second main cluster is determined as second lead vehicle of the second main cluster.

The cluster vehicles at the edge of the roadway or just the lead vehicle preferably have or has a device with highly accurate digital GPS in order to determine a location and/or a high-resolution camera, for example for detecting roadway markings. Using the described device and/or high-resolution camera, it is possible for the cluster vehicle or vehicles at the edge of the roadway or the lead vehicle to precisely follow the edge of the road. The following vehicles are then able to orient themselves with respect to the lead vehicle using a near-field sensor system, for example ultrasound sensors. For example, the following vehicles may adopt a minimum distance in terms of width with respect to one another. This constellation represents a case that is advantageous in terms of cost since it is not necessary to equip every cluster vehicle with a device with highly accurate digital GPS and/or a high-resolution camera in order to be maneuvered in the cluster.

The term "degree of automation" in the context of the document should be understood to mean driving with automated longitudinal or transverse guidance or autonomous driving with automated longitudinal and transverse guidance. Exemplary degrees of automation are assisted, partly automated, highly automated or fully automated driving, the degree of automation being cited here in increasing order. These degrees of automation have been defined by the German Federal Highway Research Institute (BASt) (see BASt publication "Forschung kompakt" [Compact research], issued November 2012). In the case of assisted driving, the driver continuously performs longitudinal or transverse guidance while the system takes over the respective other function within certain limits. In the case of partly automated driving (TAF), the system takes over the longitudinal and transverse guidance for a certain duration and/or in specific situations, wherein the driver has to continuously monitor the system as in the case of assisted driving. In the case of highly automated driving (HAF), the system takes over the longitudinal and transverse guidance for a certain duration without the driver having to continuously monitor the system; the driver must however be capable within a certain time of taking over vehicle guidance. In the case of fully automated driving (VAF), the system is able to automatically manage driving in all situations for a specific application case; a driver is then no longer required for this application case. The four degrees of automation mentioned above in accordance with the definition of the BASt correspond to SAE Levels 1 to 4 of the SAE J3016 standard (SAE—Society of Automotive Engineering). By way of example, highly automated driving (HAF) according to the BASt corresponds to Level 3 of the SAE J3016 standard. SAE J3016 furthermore also provides SAE Level 5 as the highest degree of automation, this not being contained in the definition of the BASt. SAE Level 5 corresponds to driverless driving, in which the system is able to automatically manage all situations in the same way as a human driver throughout the entire journey; a driver is then generally no longer required.

The lead vehicle (for example first lead vehicle, second lead vehicle, additional lead vehicle) may advantageously be changed when required for example due to a change in the surroundings. For example, a following vehicle may then be selected as lead vehicle or additional lead vehicle and the original lead vehicle or additional lead vehicle then becomes a following vehicle.

By virtue of the method described above for maneuvering vehicles in clusters, optimum use is able to be made of the driving area available for travel, in particular the roadway width, as a result of which the flow density of the vehicles is able to be increased and ultimately congestion formation or congestion length is able to be reduced. $CO_2$ emissions are thereby also able to be reduced, and at the same time driving comfort is able to be increased.

With regard to further technical features and advantages of the method according to the invention for maneuvering vehicles in clusters, reference is made to the explanations in connection with the method according to the invention, the figures and the description of the figures.

BRIEF DESCRIPTION OF THE DRAWINGS

The invention is explained in more detail below on the basis of examples with reference to the following figures.

DETAILED DESCRIPTION OF THE DRAWINGS

FIGS. 1-4 illustrate various situations of a method for maneuvering vehicles in clusters according to one embodiment.

Figure 1:
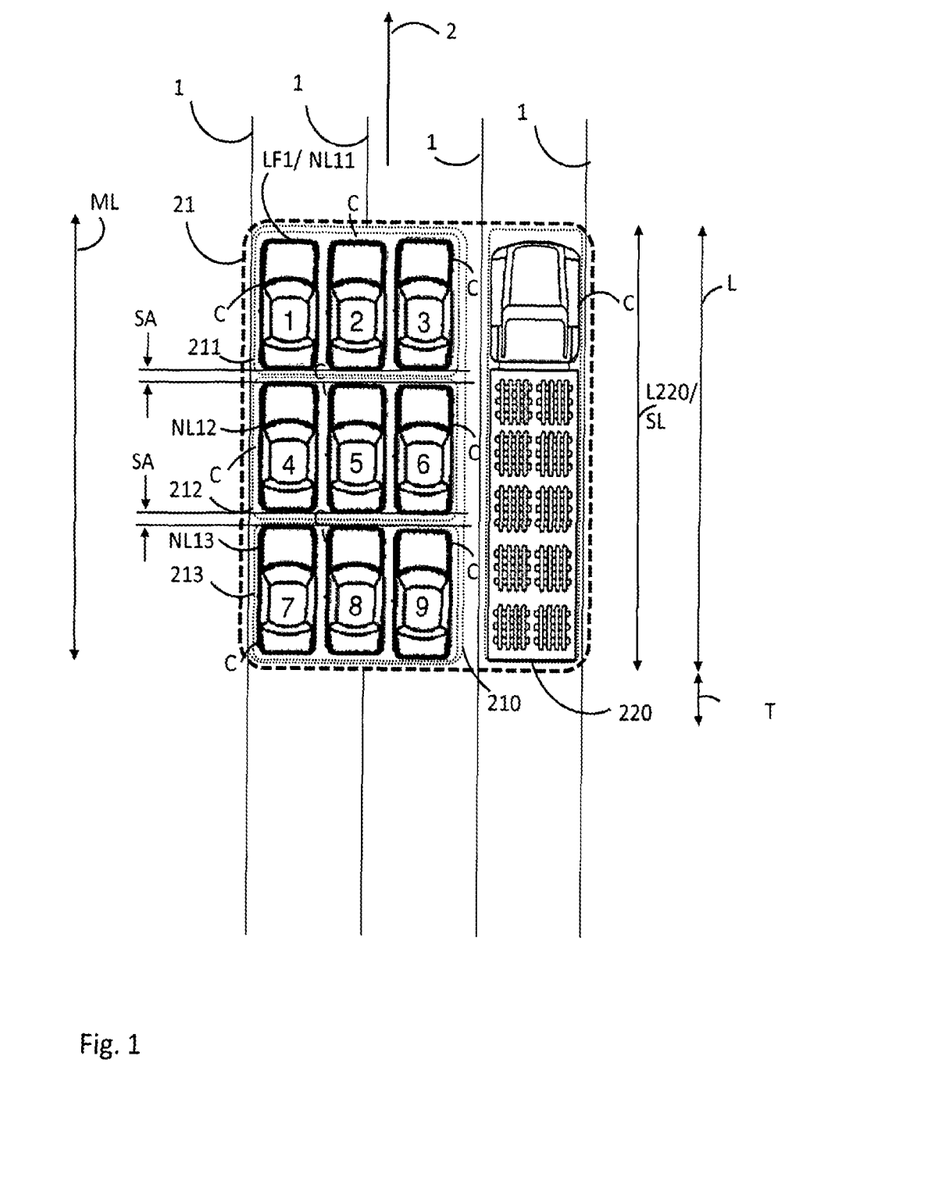
FIG. 1 serves to illustrate a method for maneuvering vehicles in clusters according to one embodiment.

FIG. 1 shows 10 cluster vehicles C that are maneuvered within a first main cluster 21. The direction of travel of the main cluster 21 is indicated by an arrow (reference sign 2). The driving lanes are separated from one another by driving lane boundaries 1. The main cluster 21 comprises two 1st-order subclusters 210 and 220. The 1st-order subcluster 210 comprises only passenger vehicles, whereas the 1st-order subcluster 220 comprises a truck. The 1st-order subcluster 210 in turn comprises three 2nd-order subclusters 211, 212 and 213. The 2nd-order subclusters 211, 212 and 213 each comprise three cluster vehicles C, specifically automobiles. The automobiles are ideally assigned to the 2nd-order subclusters according to their vehicle lengths. For example, the 2nd-order subcluster 211 thus has small automobiles, the 2nd-order subcluster 212 has vans and the 2nd-order subcluster 213 has automobiles with trailers.

The cluster formation of the main cluster 21 is formed such that the cluster length L, that is to say the dimension of a rectangular envelope imagined around the main cluster 21 in the direction of travel, corresponds to the length L220 of the 1st-order subcluster 220, that is to say the dimension of a rectangular envelope imagined around the 1st-order subcluster 220 in the direction of travel. The 1st-order subcluster 220 is in this case at the same time the longest 1st-order subcluster of the first main cluster 21.

The length L220 of the 1st-order subcluster 220 in this case corresponds to the length of the added-up lengths of the 2nd-order subclusters 211, 212 and 213, including a safety distance SA between the 2nd-order subclusters 211, 212 and 213. The cluster formation illustrated in FIG. 1 illustrates an arrangement, compacted as much as possible, of the cluster vehicles C in the first main cluster 21. Since the cluster vehicles C are additionally arranged across the driving lanes, maximum use is made of the driving area available for travel.

Out of the cluster vehicles C, the cluster vehicle C with the number 1 has been determined as first lead vehicle LF1. All of the cluster vehicles C of the first main cluster 21 orient themselves with respect to the first lead vehicle LF1. Additional lead vehicles NL11, NL12 and NL13 have each been determined for the respective 2nd-order subclusters 211, 212 and 213. Maneuvering within the 2nd-order subclusters 211, 212 and 213 is thus executed such that the respective cluster vehicles C of the respective 2nd-order subclusters 211, 212 and 213 orient themselves with respect to the corresponding additional lead vehicles NL11, NL12 and NL13.

The maneuvering of the cluster vehicles of the first main cluster 21 in the cluster formation shown in FIG. 1, that is to say the specific arrangement of the 1st-order subclusters 210 and 220 and of the 2nd-order subclusters 211, 212 and 213, is maintained for as long as the maximum length ML of the first main cluster 21 is less than or equal to the sum of the predefined cluster length L and a tolerance length T. As may be seen in FIG. 1, the maximum length ML is equal to the predefined cluster length L and therefore meets the condition whereby the shown cluster formation is maintained. The maximum length ML corresponds to the longest dimension, pointing in the direction of travel, of a rectangular envelope imagined around the main cluster 21.

Figure 2:
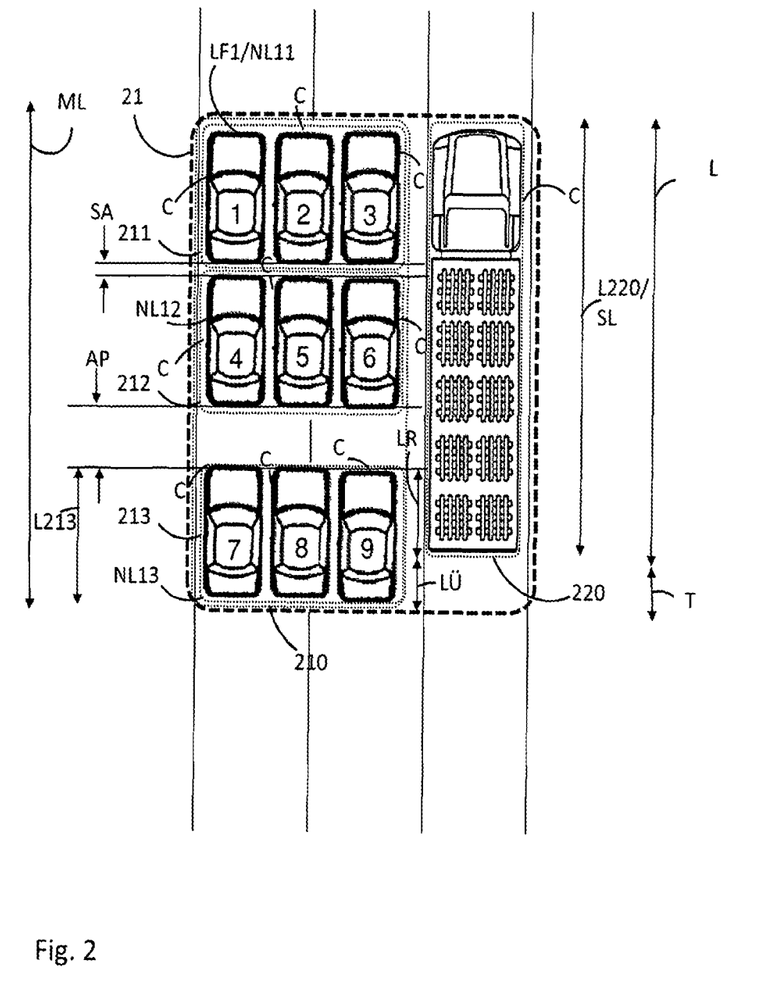
FIG. 2 serves to illustrate a method for maneuvering vehicles in clusters according to one embodiment.

FIG. 2 shows the situation in which the 2nd-order subcluster 213 has moved away from the 2nd-order subclusters 211 and 212. The original safety distance SA (see FIG. 1) to a distance buffer AP has increased between the 2nd-order subcluster 212 and the 2nd-order subcluster 213, that is to say the distance buffer includes the path distance SA and an additional path distance. The 2nd-order subcluster 213 thus protrudes beyond the 1st-order subcluster 220. The length of the 2nd-order subcluster 213 is denoted L213 in FIG. 2. The length L213 is split into a length LÜ, which denotes the length by which the 2nd-order subcluster 213 protrudes beyond the 1st-order subcluster 220, and into a length LR that denotes the length remaining when the length LÜ is subtracted from the length L213. This means that: L213=LR+LÜ.

The originally defined cluster formation for the first main cluster 21 may then also be maintained when cluster vehicles C or second-order subclusters move away from their originally assigned cluster position. Whether the cluster formation of the first main cluster 21, as shown in FIG. 2, is then maintained as was originally determined (see FIG. 1) is decided on the basis of the maximum length ML of the first main cluster 21. Since the maximum length ML of the first main cluster 21 is equal to the added-up length of the predetermined cluster length L and the tolerance length T, the cluster formation for the first main cluster 21 is maintained. In other words, the cluster formation for the first main cluster 21 is maintained if: LÜ<LR. It is also the case for the tolerance length that T=AP+L213-LR. In other words, the 2nd-order subclusters 211, 212 and 213 or the corresponding cluster vehicles C are able to move around their original cluster positions within a certain tolerance radius without the cluster formation having to be changed.

Figure 3:
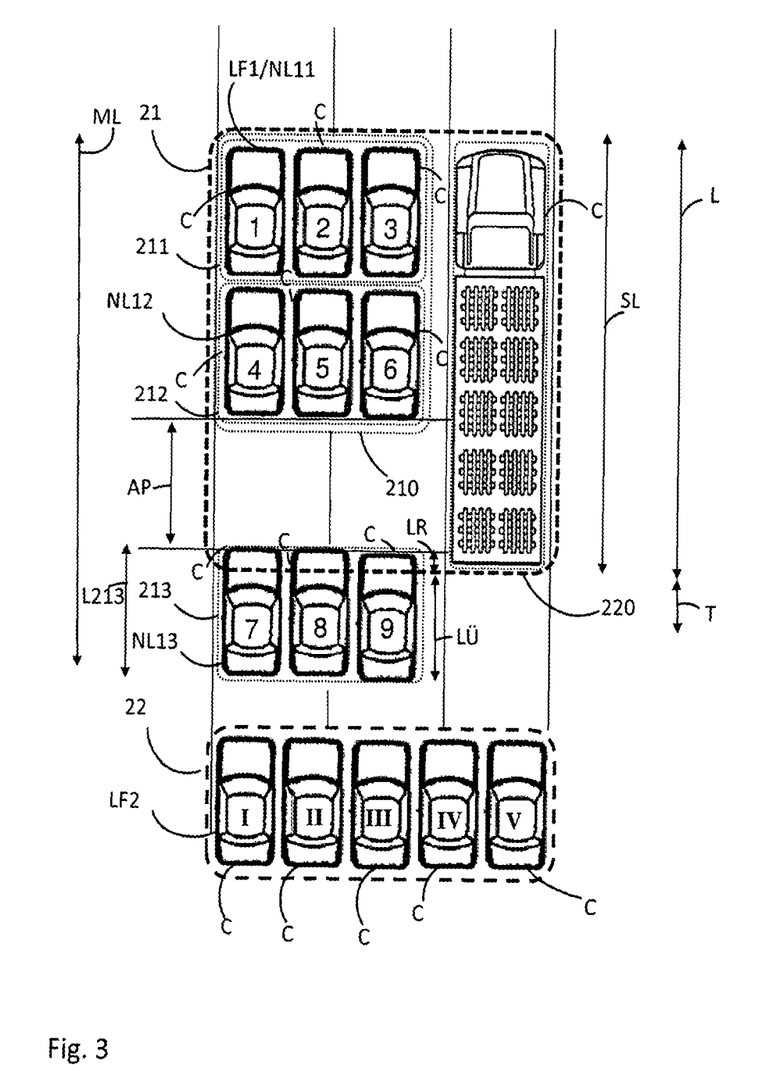
FIG. 3 serves to illustrate a method for maneuvering vehicles in clusters according to one embodiment.

FIG. 3 depicts a second main cluster 22 in addition to the first main cluster 21. Main cluster 22 consists of five cluster vehicles that are maneuvered by orienting themselves with respect to a second lead vehicle LF2. Main cluster 22 is maneuvered completely independently of main cluster 21. FIG. 3 illustrates the situation in which the 2nd-order subcluster 213 has moved away from the other 2nd-order subclusters 211 and 212 to such an extent, or in which the distance buffer AP has become so great, that the condition whereby the maximum length ML of the main cluster 21 is less than or equal to the sum of the cluster length L and the tolerance length T is no longer met. In other words, the 2nd-order subcluster 213 has moved away from the other second-order subclusters 211 and 212 to such an extent, or the distance buffer AP has become so great, that the condition LÜ<LR is no longer met. As may be seen in FIG. 3, the maximum length ML of the first main cluster 21 is longer than the addition of the cluster length L and the tolerance length T, and the length that describes the overhanging part of the 2nd-order subcluster 213 is longer than the length that describes the remaining part of the 2nd-order subcluster 213. The cluster formation for the first main cluster 21 therefore changes by the 2nd-order subcluster 213 being excluded from the first main cluster 21.

Figure 4:
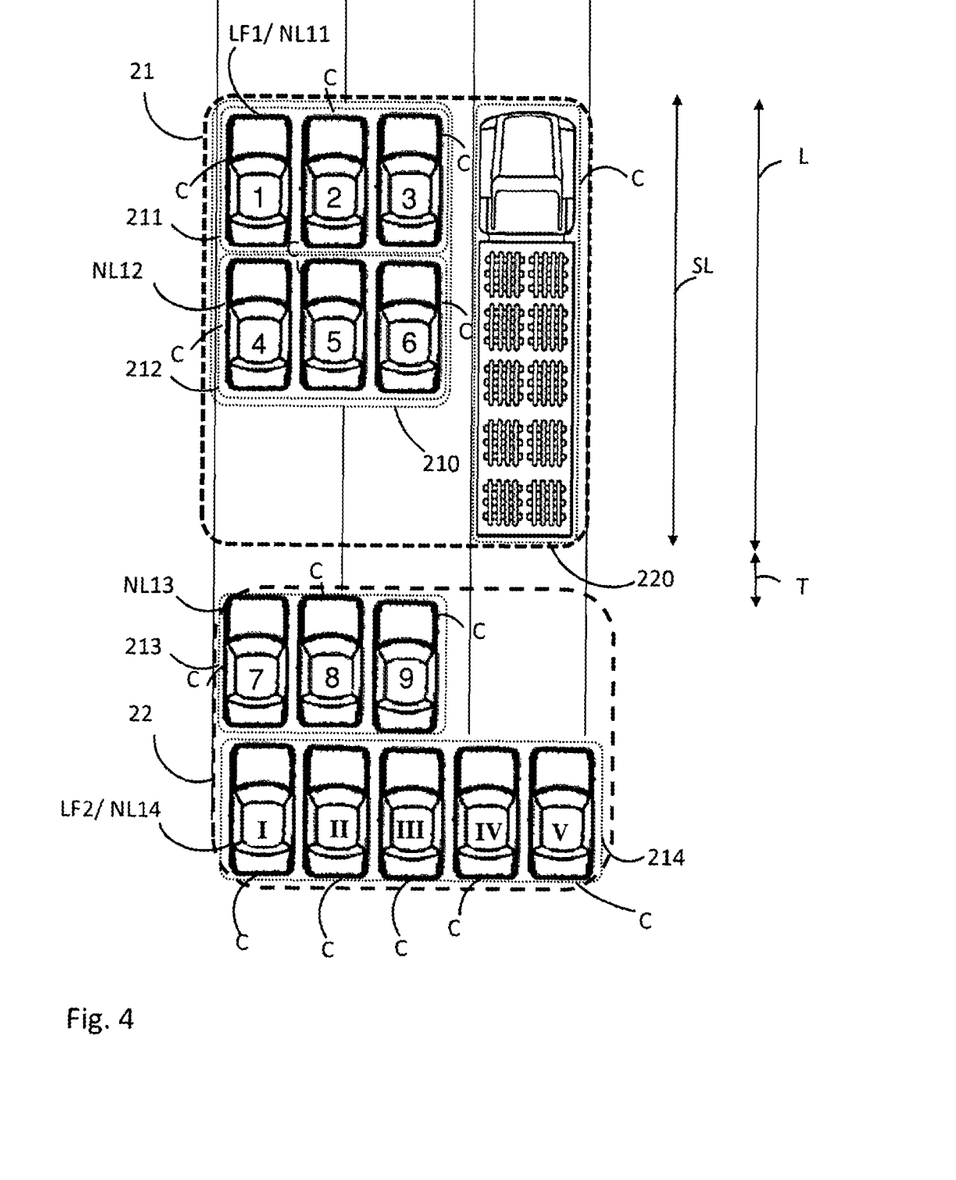
FIG. 4 serves to illustrate a method for maneuvering vehicles in clusters according to one embodiment.

FIG. 4 describes the situation in which the 2nd-order subcluster 213 excluded from the first main cluster 21 has been incorporated into the second main cluster 22. The second main cluster then consists of the 2nd-order subcluster 213 and the 2nd-order subcluster 214, wherein the 2nd-order subcluster 213 is maneuvered by the additional lead vehicle NL13 and the 2nd-order subcluster 214 is maneuvered by the additional lead vehicle NL14. The additional lead vehicle NL14 at the same time functions as second lead vehicle LF2 for the second main cluster 22.

A new (first) cluster formation at the same time results for the first main cluster 21. The first main cluster 21 in FIG. 4 comprises two 1st-order subclusters 210 and 220, wherein the 1st-order subcluster 210 now only comprises two 2nd-order subclusters 211 and 212.

The change in 2nd-order subclusters belonging to a 1st-order subcluster and in a 1st-order subcluster belonging to a main cluster may already be performed by way of a collective braking or acceleration maneuver on a road being traveled. In this case, subcluster convoys are preferably broken up and "moved to the back" in a collective acceleration maneuver, for example when moving off after congestion has cleared. In the case of a braking maneuver, the accumulation of an nth-order subcluster is used to fill available gaps in the subclusters driving away, and a subcluster is thus preferably ascribed to a cluster driving in front.

What is claimed is:

1. A method for maneuvering vehicles in clusters, the method comprising:

forming a first main cluster, wherein the first main cluster comprises at least two 1st-order subclusters each having at least one cluster vehicle, and wherein the first main cluster has a first cluster formation with a predefined cluster length;

determining a first lead vehicle for the first main cluster from the cluster vehicles; and maneuvering the first main cluster, wherein the cluster vehicles of the first main cluster orient themselves with respect to the first lead vehicle and wherein the first cluster formation is maintained for the first main cluster for as long as a maximum length of the first main cluster is less than or equal to a sum of the predefined cluster length and a tolerance length, wherein, when the first main cluster is formed and/or maneuvered, at least one wing mirror of at least one of the cluster vehicles of the first main cluster is folded in.

2. The method according to claim 1, wherein at least one of the 1st-order subclusters has at least two 2nd-order subclusters each having at least one cluster vehicle, and a 2nd-order subcluster is excluded from the first main cluster if the maximum length of the first main cluster is greater than the sum of the predefined cluster length and the tolerance length.

3. The method according to claim 1, wherein the first main cluster has different types of vehicle and the predefined cluster length corresponds to the length of the longest 1st-order subcluster.

4. The method according to claim 2, further comprising:

forming a second main cluster for cluster vehicles, wherein the second main cluster has a second cluster formation;

determining a second lead vehicle for the second main cluster from the cluster vehicles; and maneuvering the first main cluster and the second main cluster, wherein the cluster vehicles of the first main cluster orient themselves with respect to the first lead vehicle and the cluster vehicles of the second main cluster orient themselves with respect to the second lead vehicle;

wherein the 2nd-order subcluster excluded from the first main cluster is furthermore incorporated into the second main cluster.

5. The method according to claim 4, further comprising:

determining an additional lead vehicle for at least one of the 2nd-order subclusters from the cluster vehicles of the first main cluster and of the second main cluster; and wherein maneuvering the first main cluster and the second main cluster comprises maneuvering the at least one 2nd-order subcluster, wherein the cluster vehicles of the respective 2nd-order subcluster orient themselves with respect to the respective additional lead vehicle.

6. The method according to claim 2, further comprising:

determining an additional lead vehicle for at least one of the 2nd-order subclusters from the cluster vehicles of the first main cluster; and wherein maneuvering the first main cluster comprises maneuvering the at least one 2nd-order subcluster, wherein the cluster vehicles of the respective 2nd-order subcluster orient themselves with respect to the respective additional lead vehicle.

7. The method according to claim 4, wherein the first cluster formation and the second cluster formation are determined depending on vehicle dimensions of the respective cluster vehicles and the driving area available for travel.

8. The method according to claim 7, wherein, when the first main cluster and the second main cluster is formed, the cluster vehicles are arranged independently of predefined driving lanes and/or predefined minimum distances between the cluster vehicles.

9. The method according to claim 4, wherein, when the second main cluster is formed and/or maneuvered, at least one wing mirror of the cluster vehicles of the second main cluster is folded in.

10. The method according to claim 4, wherein the first main cluster and/or the second main cluster have cluster positions corresponding to the first cluster formation or the second cluster formation;

wherein, in the case of traffic driving on the left-hand side, at least one of the following actions is performed:

(i) determining the cluster vehicle at the front left cluster position, in the direction of travel, of the first main cluster as first lead vehicle;

(ii) determining the cluster vehicle at the front left cluster position, in the direction of travel, of the second main cluster as second lead vehicle; or (iii) determining the cluster vehicle at the front left cluster position, in the direction of travel, of a 2nd-order subcluster as additional lead vehicle;

and wherein, in the case of traffic driving on the right-hand side, at least one of the following actions is performed:

(i) determining the cluster vehicle at the front right cluster position, in the direction of travel, of the first main cluster as first lead vehicle;

(ii) determining the cluster vehicle at the front right cluster position, in the direction of travel, of the second main cluster as second lead vehicle; or (iii) determining the cluster vehicle at the front right cluster position, in the direction of travel, of a 2nd-order subcluster as additional lead vehicle.

11. The method according to claim 4, wherein at least one of the following actions is performed:

determining the cluster vehicle that has the highest degree of automation from the first main cluster as first lead vehicle of the first main cluster;

determining the cluster vehicle that has the highest degree of automation from a 2nd-order subcluster as additional lead vehicle; or determining the cluster vehicle that has the highest degree of automation from the second main cluster as second lead vehicle of the second main cluster.

12. The method according to claim 2, wherein the first cluster formation is determined depending on vehicle dimensions of the respective cluster vehicles and the driving area available for travel.

13. The method according to claim 12, wherein, when the first main cluster is formed, the cluster vehicles are arranged independently of predefined driving lanes and/or predefined minimum distances between the cluster vehicles.

* * * * *